US005277438A

United States Patent [19]

Chuang

[11] Patent Number: 5,277,438

[45] **Date of Patent: * Jan. 11, 1994**

[54] COLLAPSIBLE RECUPERATING WALKER

[76] Inventor: Ching P. Chuang, No. 120-18, Yu Che, Yu Che Li, Ma Tou Chen, Tainan Hsien, Taiwan

[ * ] Notice: The portion of the term of this patent subsequent to Nov. 16, 2010 has been disclaimed.

[21] Appl. No.: 695

[22] Filed: Jan. 5, 1993

[51] Int. Cl.5 .......................... A61H 3/04; B62B 7/08

[52] U.S. Cl. .................................. 280/42; 280/87.05; 482/68; 297/5; 135/67; 135/74; 135/75; 403/93

[58] Field of Search .................... 280/639, 47.4, 87.05, 280/87.051, 42, 647, 650, 651; 482/66, 67, 68, 69; 135/67, 74, 75; 297/5, 6; 403/92, 93, 96; 16/44, 35 R; 188/1.12, 2 D

[56] References Cited

U.S. PATENT DOCUMENTS 1,361,102 12/1920 Scott ........................................ 297/5
1,431,389 10/1922 Frisz ........................................ 403/93
2,077,569 4/1937 Kish ........................................ 482/67
3,419,295 12/1968 Small ........................................ 403/92
3,455,313 7/1969 King ........................................ 135/67
3,516,425 6/1970 Rigal ........................................ 135/67
4,029,311 6/1977 Chanslor et al. ........................ 482/68
4,046,374 9/1977 Breyley ........................................ 280/42
4,253,678 3/1981 Leclerc ........................................ 280/42
4,312,505 1/1982 Engelhart ........................................ 482/68
5,133,377 7/1992 Truxillo ........................................ 135/75

FOREIGN PATENT DOCUMENTS 0579543 8/1946 United Kingdom .................. 482/67

*Primary Examiner*—Margaret A. Focarino
*Assistant Examiner*—Peter English
*Attorney, Agent, or Firm*—Morton J. Rosenberg; David I. Klein

[57] ABSTRACT

A collapsible recuperating walker having a seat frame and a standing frame is provided. The seat and standing frames are combined with bendable rods extending between the respective two side frames thereof. Each of the side frames are adjustable in height. The bendable rods are angularly displaced to collapse the walker to a smaller size for carrying and transportation. Casters are provided and are controlled to stop or to provide resistance, by means of brake units.

5 Claims, 8 Drawing Sheets

COLLAPSIBLE RECUPERATING WALKER

BACKGROUND OF THE INVENTION

A conventional recuperating walker, as shown in FIG. 14, is well known, but it has disadvantages as follows:

1. Its height is not adjustable to suit the different heights of the persons using it;

2. It occupies a rather large storage space, due to its lack of collapsibility;

3. It is not convenient for carrying or transporting, as it is not collapsible; and, 4. It has no brake structure, and thus the user is liable to have an accident.

SUMMARY OF THE INVENTION

This invention has been devised with the following advantages and objectives:

1. It has a height adjusting structure.

2. It is collapsible so as to occupy a smaller storage space.

3. It is convenient for carrying or transportation because of its collapsibility.

4. It has a brake unit to prevent accidents.

5. The brake unit helps a patient in performing recuperating exercises, by adjusting the amount of resistance of the casters.

BRIEF DESCRIPTION OF THE DRAWINGS

The invention will be better understood by reference to the accompanying drawings, wherein.

DETAILED DESCRIPTION OF THE PREFERRED EMBODIMENTS

Figure 1:
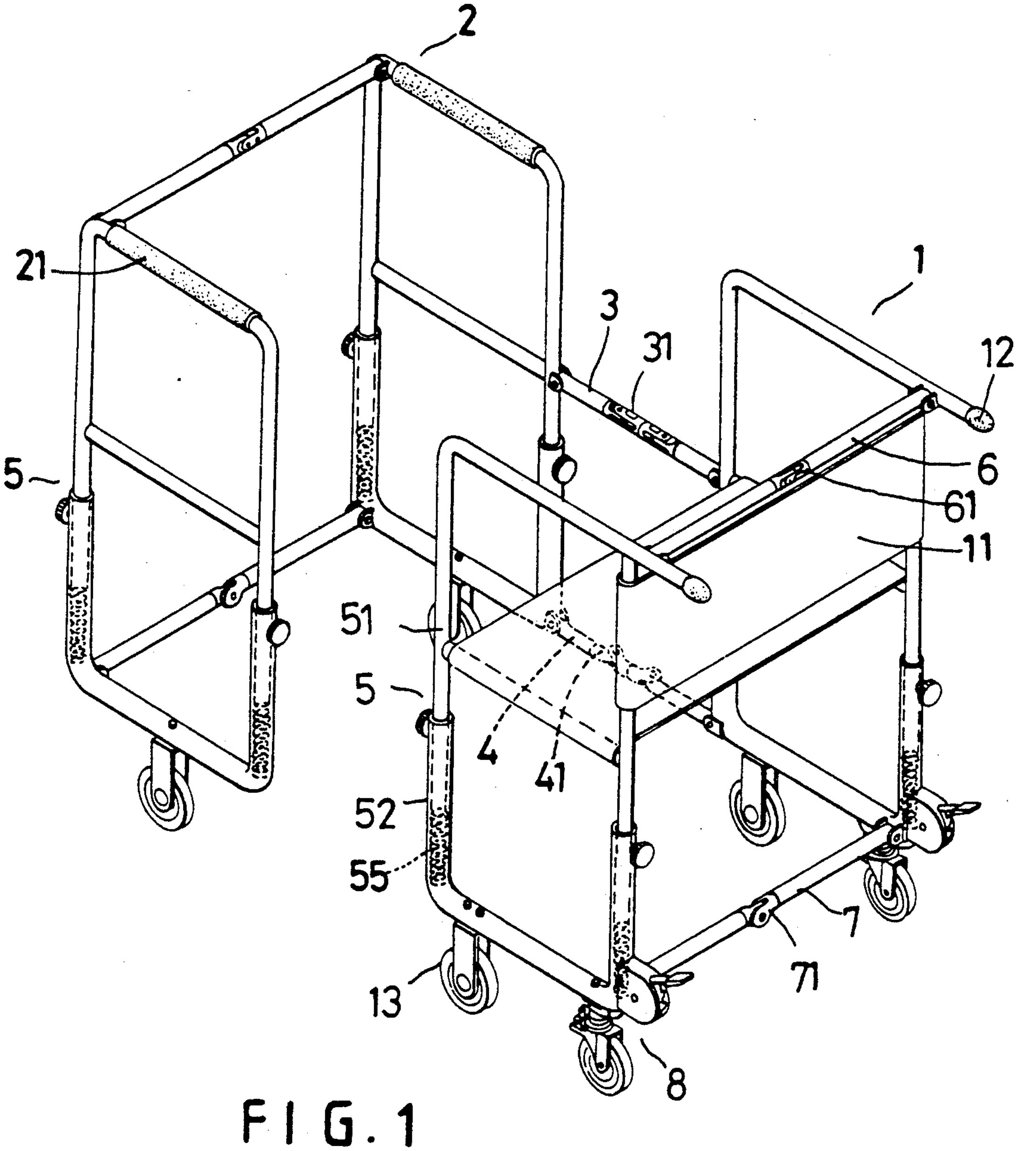
FIG. 1 is a perspective view of a collapsible recuperating walker of the present invention.

A collapsible recuperating walker of the present invention, as shown in FIG. 1, comprises a seat frame 1, a standing frame 2, a double bendable rod 3, a double ball bendable rod 4 and two sets of brake units B, B as main components.

The seat frame 1 comprises two side frames 5, 5 a bendable rod 6, a ball bendable rod 7 and two sets of brake units B, B combined together. The bendable rod 6 is combined between rear upper portions of the two side frames 5, 5 and the ball bendable rod 7 is combined between rear lower portions of the two side frames 5, 5. A back rest 11 is stretched between the rear portions of the side frames 5, 5 just under the bendable rod 6. Two grips 12, 12 are provided to extend rearward from the two upper tubes of the side frames 5, 5. Two brake units 8, 8 are disposed under rear horizontal portions of the respective U-shaped tubes 52, 52, and two casters 13, 13 are disposed under front horizontal portions of the U-shaped tubes 52, 52, to enable the collapsible recuperating walker to move on the ground.

The standing frame 2 comprises two side frames 5, 5 connected together with a bendable rod 6 and a ball bendable rod 7 disposed on a front side thereof. A protective cover 21 is respectively provided around an upper horizontal portion of each side frame 5, and a caster is provided under a bottom portion of each side frame 5.

Figure 3:
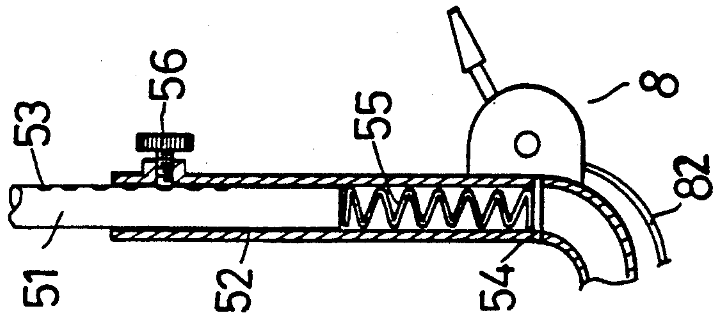
FIG. 3 is a cross-sectional view of a U-shaped tube of the side frame for the collapsible recuperating walker of the present invention.
Figure 2:
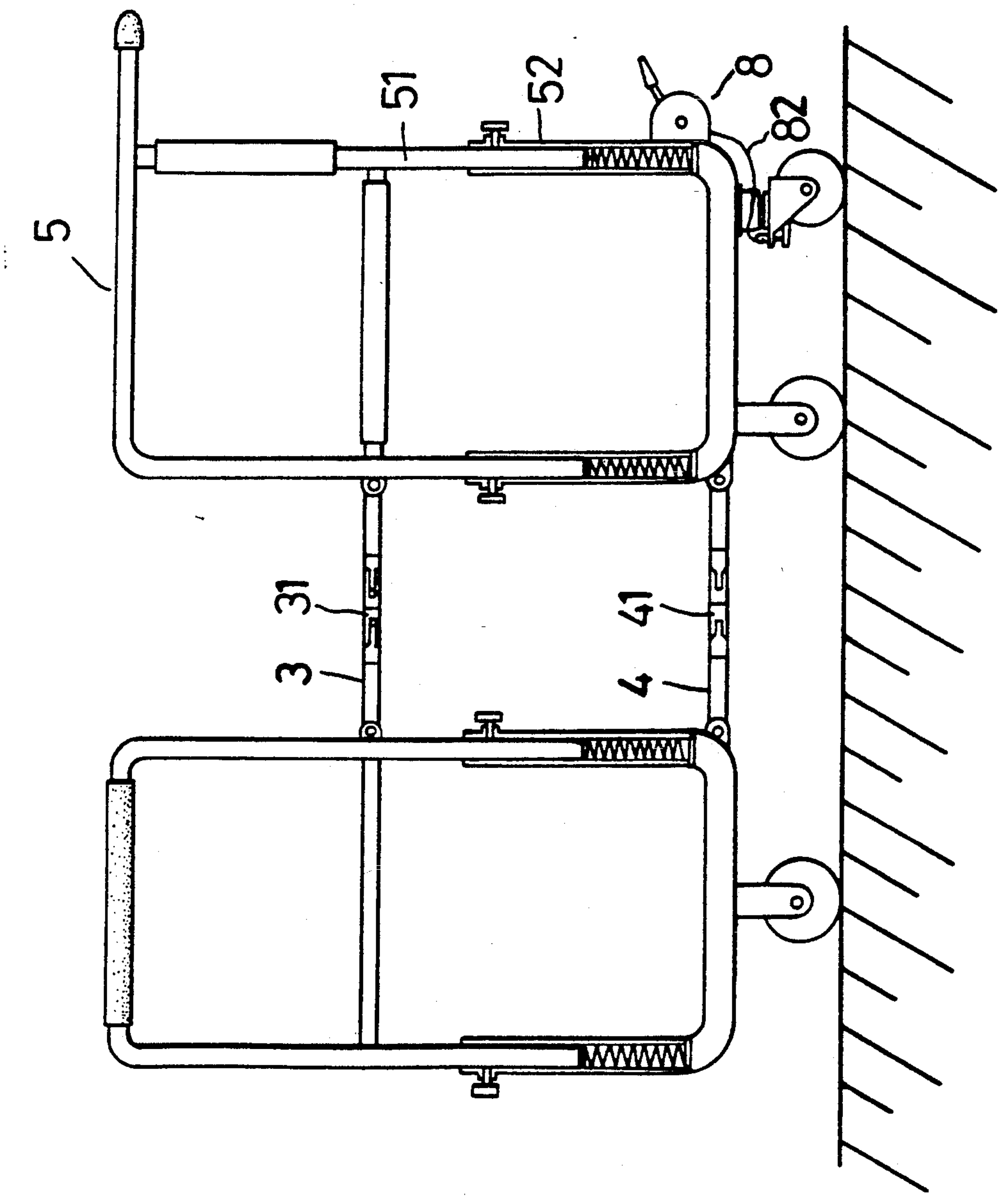
FIG. 2 is a cross-sectional view of the side frames combined together for the collapsible recuperating walker of the present invention.

Each of the side frames 5 of the seat frame 1 and of the standing frame 2 consists of an A-shaped tube 51 and a U-shaped tube 52, as shown in FIGS. 2 and 3. Each A-shaped tube 51 has two parallel vertical portions bored with a plurality of holes 53 equally spaced apart, and each U-shaped tube 52 has two vertical parallel portions respectively containing a stopper 54 and a first spring 55 standing on the stopper 54, so as to elastically support a bottom end of each vertical portion of the A-shaped tube 51. Each of the vertical portions of the U-shaped tube 52 has an adjusting screw 56 engaged through an upper wall, to selectably fit into one of the holes 53 formed in the A-shaped tube 51. The A-shaped tube 51 can thereby be adjustably positioned relative to the U-shaped tube 52 to properly adjust the height of the collapsible recuperating walker for a particular user.

Figure 4:
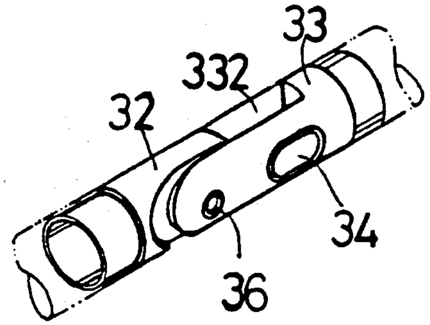
FIG. 4 is a perspective view of a bendable structure used in a bendable rod of the present invention.
Figure 5:
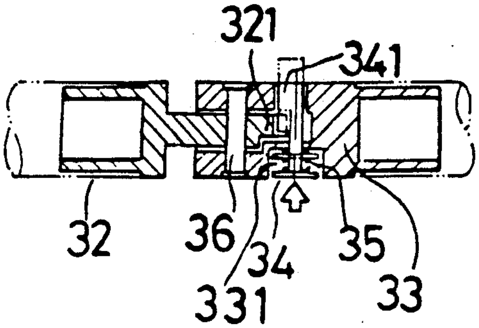
FIG. 5 is a cross-sectional view of the bendable structure used in the bendable rod the present invention.
Figure 6:
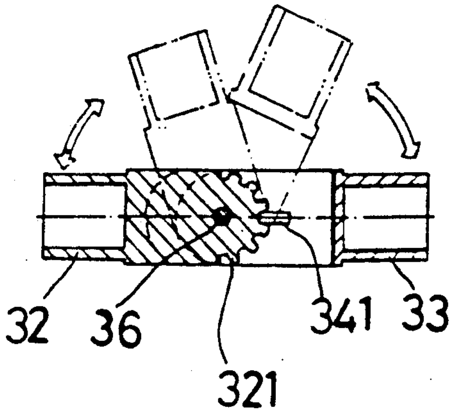
FIG. 6 is a cross-sectional view of the bendable structure depicting displacement of the coupled members.

Bendable structures 31, 61 used in the double bendable rod 3 and the bendable rods 6 are the same, as shown in FIGS. 4, 5, and 6. The bendable structure 31 comprises a male joint 32, a female joint 33, a push rod 34, a second spring 35 and a pin 36. The push rod 34 together with the spring 35 are laterally deposited in an opening 332 of the female joint 33 and the body of the push rod 34 is inserted through a rectangular hole 331 to engage one of teeth 321 at the front of the male joint 32, thereby firmly securing the female joint 33 with the male joint 32. A pin 36 is provided to pivotally connect both the male joint 32 and the female joint 33, together. When the push rod 34 is pushed fully inward, a projection 341 of the push rod 34 is displaced from interface with a respective pair of teeth of the tooth portion 321 of the male joint 32, so that the female joint 33 may be bent to an angle needed in relation to the male joint 32. Subsequently, the push rod 35 is released to return to its previous position by the force of spring 35, with the projection 341 engaging the tooth portion 321, between a respective pair of teeth, to firmly secure the position of both joints 32, 33 in a newly adjusted angle.

Figure 7:
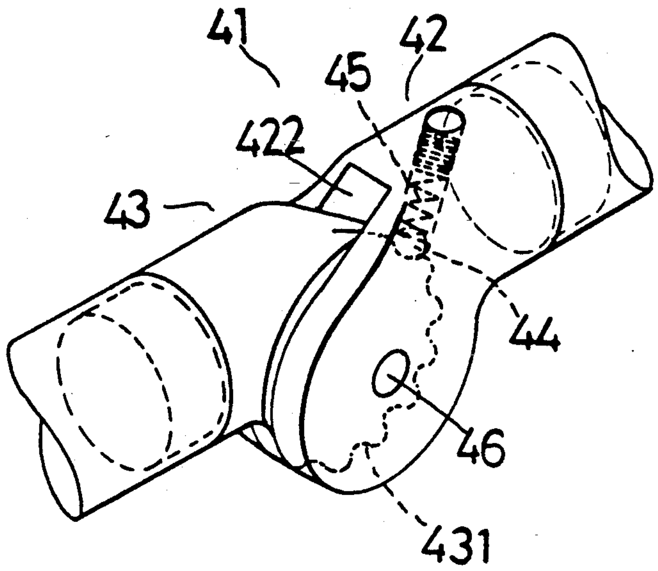
FIG. 7 is a perspective view of a ball bendable structure used in a ball bendable rod of the present invention.
Figure 8:
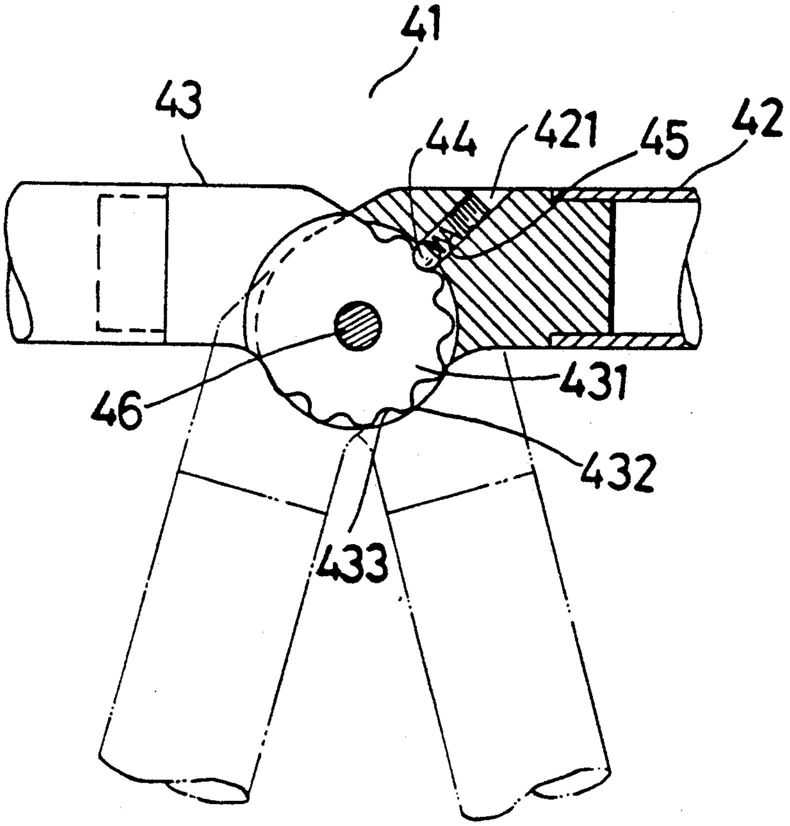
FIG. 8 is an elevation view of the ball bendable structure depicting displacement of the coupled members.

Ball bendable structures 41, 71, used in the double ball bendable rod 4 and a ball bendable rod 7 are the same, as shown in FIGS. 7 and 8. The ball bendable structure 41 comprises a male joint 43, a female joint 42, a ball 44, a third spring 45 and a pin 46. The ball 44 with the spring 45 is deposited in a cavity 421 of the female joint 42. The male joint 43 has its front end inserted in a central opening 422 of the female joint 42 and is pivotally coupled together with the female joint 42 with the pin 46, permitting the male joint 43 to be rotated to a desired angle relative to the female joint 42. When the male joint 43 is rotated with a sufficient force, the ball 44, biased by the spring 45, slides over the tooth portion 431 of the male joint 43 and then engages one of grooves 433 between two teeth 432, selected to keep both joints 42, 43 firmly in a required straight or angled position.

Figure 10:
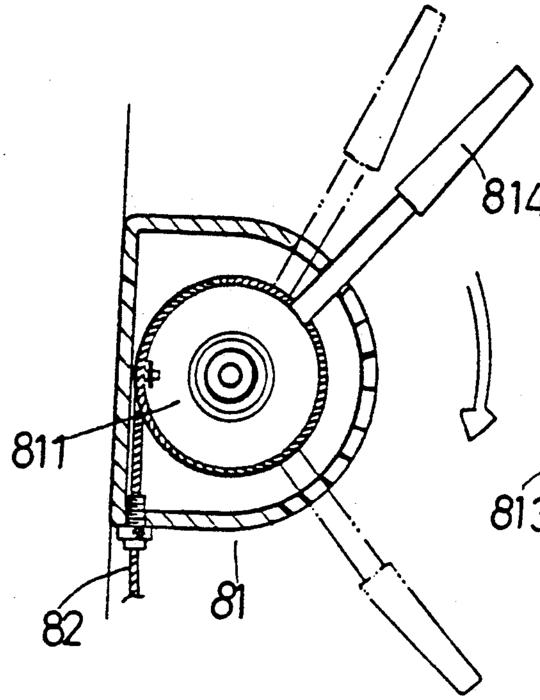
FIG. 10 is a cross-sectional view of an adjusting member for the brake unit for the collapsible recuperating walker of the present invention.
Figure 11:
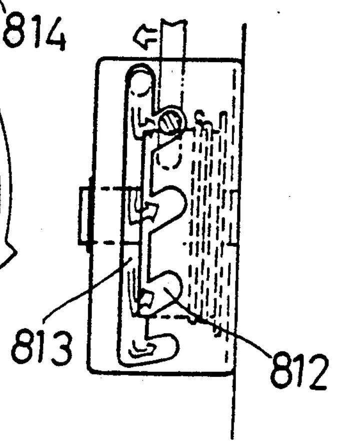
FIG. 11 is a side view of the adjusting member for the brake unit for the collapsible recuperating walker of the present invention.
Figure 9:
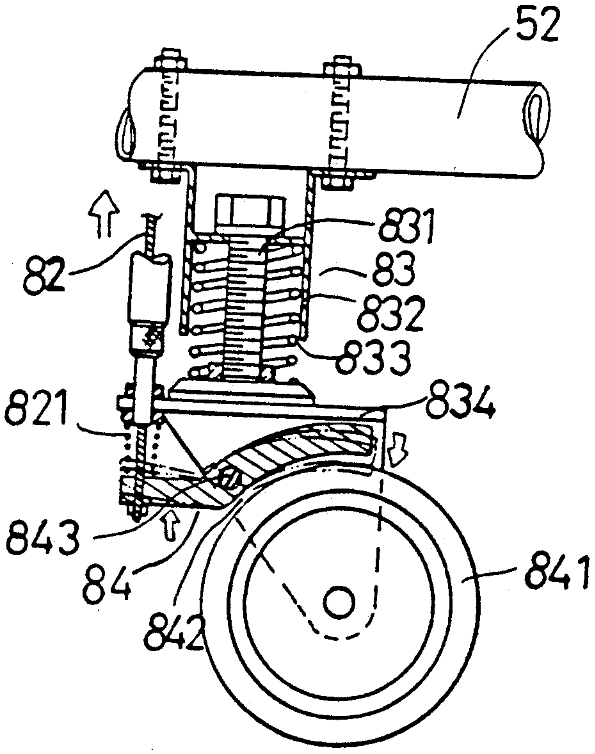
FIG. 9 is a cross-sectional view of a brake unit for the collapsible recuperating walker of the present invention.

Each brake unit 8 consists of an adjusting base 81, a wire rope 82, an anti-vibration base 83 and a brake lining 84, as shown in FIGS. 9, 10. The adjusting base 81 has a semi-circular housing, which has its semi-circular side surface bored with a guide slot 813 and a plurality of angled notches 812 equally spaced apart along the slot 813. A handle 814 passes through the slot 813 and is fixed to a rotatable ring 811 in the housing. A wire rope 82 is wound around the rotatable ring 811, having one of its ends extending through a fourth spring 821 and fixed to the brake lining 84. Brake lining 84 is fixed with a shaft 843, as a pivot, in an intermediate portion thereof. The adjusting base 83 has a cylinder 832 affixed to a horizontal portion of the U-shaped tube 52. A fifth coil spring 833 is disposed around a rod 831 within the cylinder 832, the rod 831 having its lower end firmly fixed to a wheel base 834, so that the coil spring 833 elastically supports the U-shaped tube 52. A caster 841 is provided under the brake lining 84, pivotally coupled to the adjusted base 83, with a gap 842 between itself and the brake lining 84. When the adjusting handle 814 is altered in its position, engaging one of the notches 812, the brake lining 84 is pulled by the wire rope 82 to change the width of the gap 842, accordingly.

In use, the height of the collapsible recuperating walker is adjusted, by a nurse or others, by fitting the adjusting screw 56 in one of the holes 53 in the U-shaped tubes 52, at a height to suit a patient using it. Then the patient is helped to sit on the seat of the seat frame 1, practicing to stand with his hands holding the protective covers 21, 21 of the standing frame 2, and then to walk depending on this walker. However, the nurse will adjust the moving speed of the casters, by first inspecting the moving speed of the patient's legs, and then adjusting the handle 814 to add resistance by displacing the brake lining 84.

Figure 12:
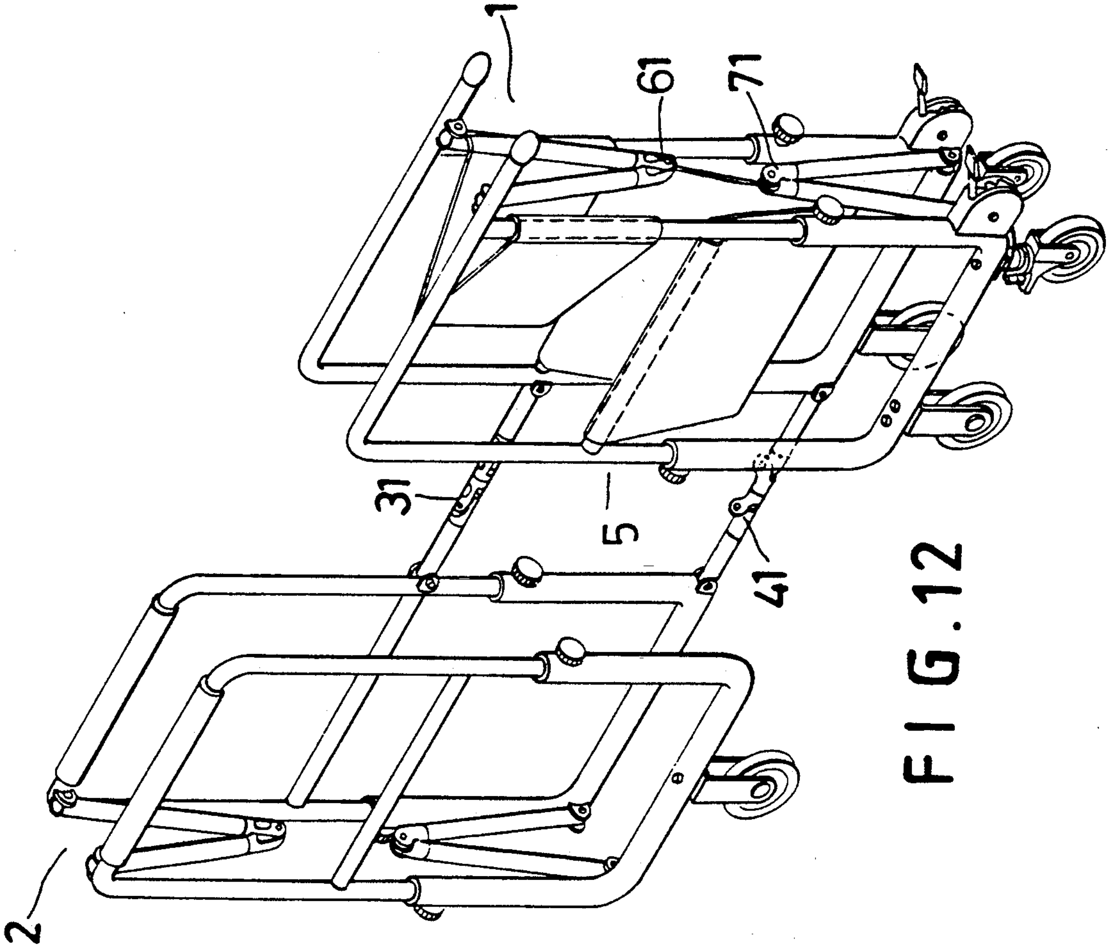
FIG. 12 is a perspective view of the collapsible recuperating walker depicting the first stage of its collapsed state.
Figure 13:
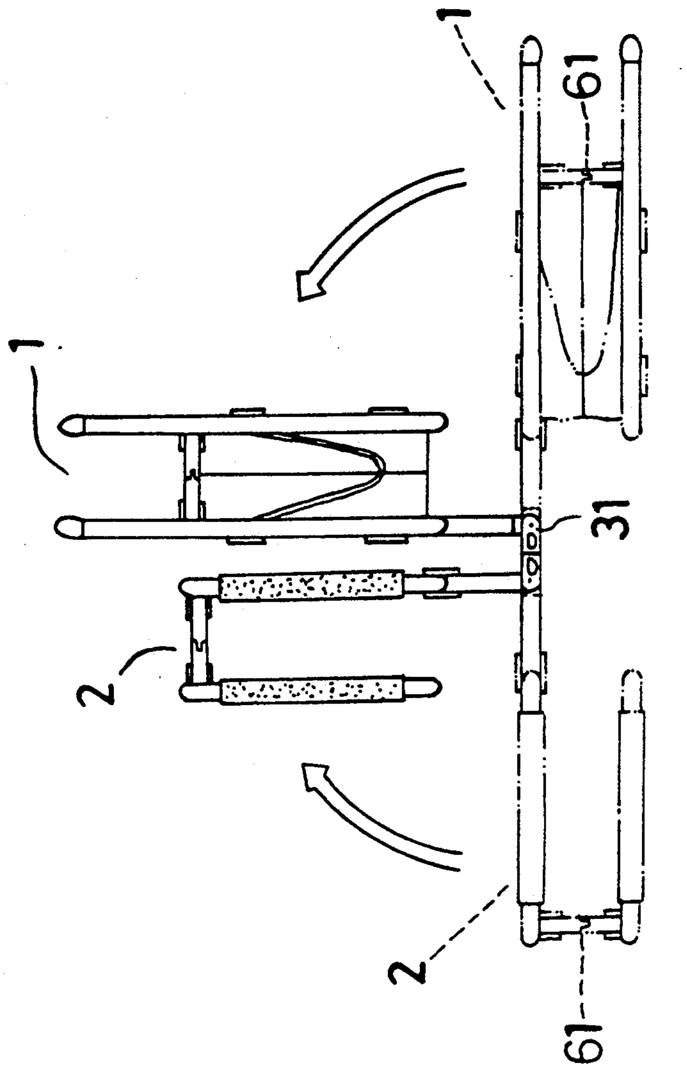
FIG. 13 is a top view of the collapsible recuperating walker depicting it being disposed in the completely collapsed state; and, FIG. 14 is a perspective view of a prior art collapsible recuperating walker.
Figure 14:
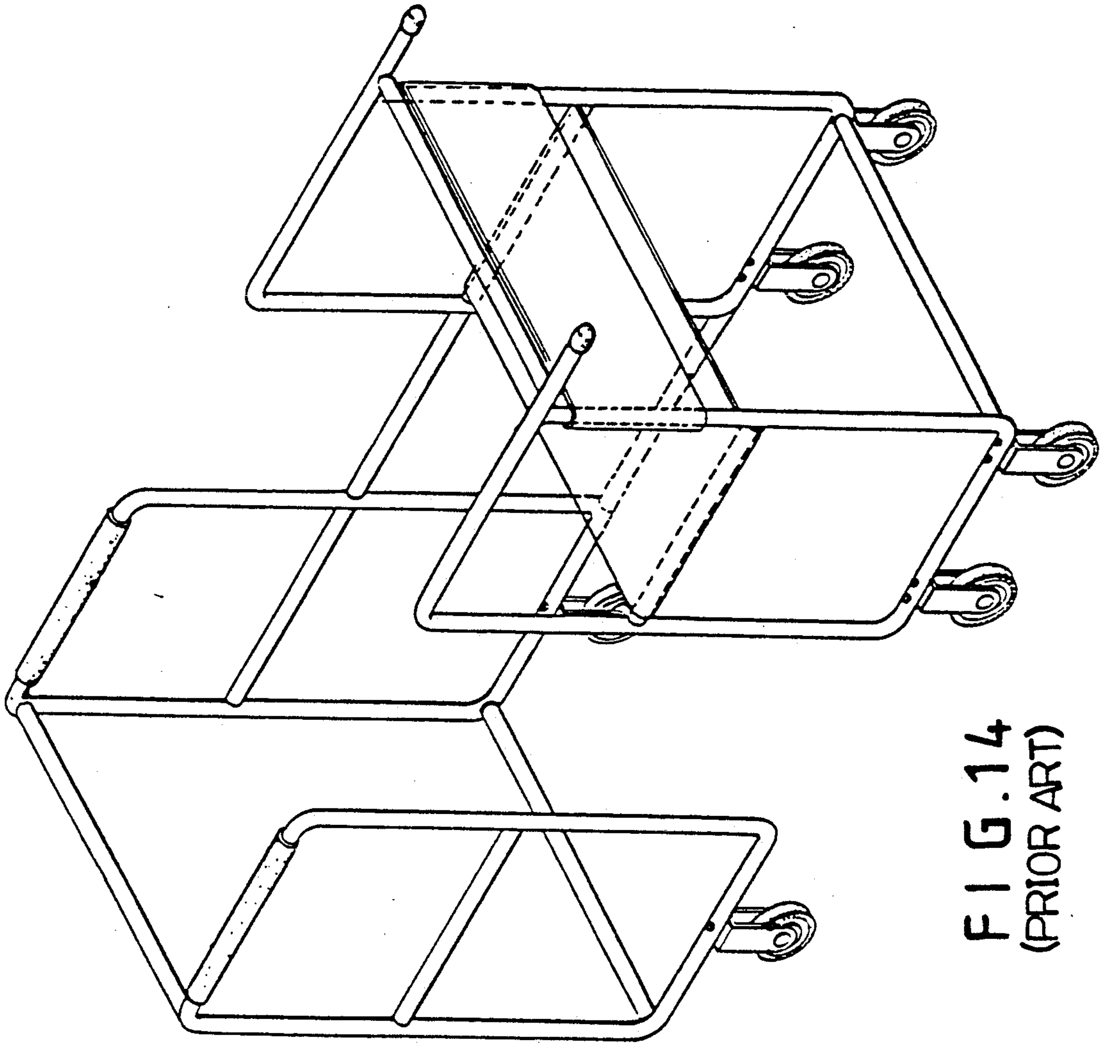
FIG. 14 (PRIOR ART)

When this collapsible recuperating walker is not in use, as when it is to be carried or to be stored away, the bending structures 61, 71 are adjusted as shown in FIG. 12 so that the side frames 5, 5 of the seat frame 1 and the standing frame 2 are pulled nearer to each other. And then, the bending structures 31, 41 are also displaced as shown in FIG. 13, so as to make the seat frame 1 and the standing frame 2 rotate toward each other and thereby stand side by side.

While the preferred embodiments of the invention have been described above, it will be recognized and understood that various modifications may be made therein and the appended claims are intended to cover all such modifications which may fall within the spirit and scope of the invention.

What is claimed is:

1. A collapsible recuperating walker comprising:

a seat frame defined by a pair of first side frames coupled one to another by a first upper horizontal member and a first lower horizontal member extending therebetween; each of said first side frames having a lower portion defined by a first U-shaped tubular member and an upper portion defined by a first A-shaped tubular member, said first A-shaped tubular member including a pair of vertical legs telescopically received within respective vertical portions of said first U-shaped tubular member and releasably coupled therein for adjusting a height dimension of a respective first side frame;

a standing frame defined by a pair of second side frames coupled one to another by a second upper horizontal member and a second lower horizontal member extending therebetween; each of said second side frames having a lower portion defined by a second U-shaped tubular member and an upper portion defined by a second A-shaped tubular member, said second A-shaped tubular member including a pair of vertical legs telescopically received within respective vertical portions of said second U-shaped tubular member and releasably coupled therein for adjusting a height dimension of a respective second side frame; and, double bendable coupling means for coupling said seat frame to said standing frame, said double bendable coupling means including at least a first rod member having a pair of longitudinally spaced first pivotal joints disposed intermediate opposing ends thereof, one of said opposing ends being coupled to a front portion of one of said first side frames and the other of said opposing ends being coupled to a rear portion of a respective second side frame, each of said first and second upper horizontal members having a second pivotal joint disposed intermediate opposing ends thereof, each of said first and second lower horizontal members having a third pivotal joint disposed intermediate opposing ends thereof, whereby each of said respective pairs of said first and second side frames are foldably displaceable each toward the other of a respective pair to form two folded pairs and each of said folded pairs being foldably displaceable one pair toward another about said double bendable coupling means.

2. The collapsible recuperating walker as recited in claim 1 where said pair of vertical legs of each of said first and second A-shaped tubular members are each formed with a plurality of vertically spaced through openings, wherein said height adjustment of said respective first and second side frames is provided by selection of a particular vertically spaced through opening of each of said vertical legs of said first and second A-shaped tubular members for receipt of a fastener threadedly coupled through said respective vertical portions of said first and second U-shaped tubular members, each of said vertical portions of said first and second U-shaped tubular members having a spring disposed therein, said spring having one end disposed against a stopper secured within a respective vertical portion of a respective U-shaped tubular member for biasing a respective leg of a respective A-shaped tubular member.

3. The collapsible recuperating walker as recited in claim 1 where said second pivotal joint includes:

a. a first female member having a longitudinally directed recess formed in one end thereof;

b. a first male member having a plurality of radially displaced teeth formed on one end thereof, said first male member being pivotally coupled to said first female member with said teeth disposed within said recess; and, c. a spring biased rod member disposed within a bore formed in said end of said first female member, said bore opening into said recess and extending in a direction transverse thereto, said rod member having a projection formed thereon and extending into said recess for releasable engagement between a pair of said plurality of teeth, said projection being disengaged from between said pair of teeth responsive to a predetermined displacement of said rod member against a spring bias force.

4. The collapsible recuperating walker as recited in claim 1 where said third pivotal joint includes:

a. a second female member having a longitudinally directed recess formed in one end thereof;

b. a second male member having a plurality of radially displaced teeth formed on one end thereof, said second male member being pivotally coupled to said second female member with said teeth disposed within said recess of said second female member; and, c. detent means coupled to said second female member for releasable engagement with a respective recess formed between each of said plurality of teeth of said second male member, said detent means including (1) a ball member disposed within a substantially longitudinally directed bore formed in said second female member, and (2) a spring disposed within said bore formed in said second female member for biasing said ball member into engagement with a respective recess formed between each of said plurality of teeth of said second male member.

5. The collapsible recuperating walker as recited in claim 1 further comprising brake means coupled to said seat frame for applying resistance to rotation of a pair of casters resiliently mounted to said seat frame.

* * * * *